United States Patent Office 3,322,498
Patented May 30, 1967

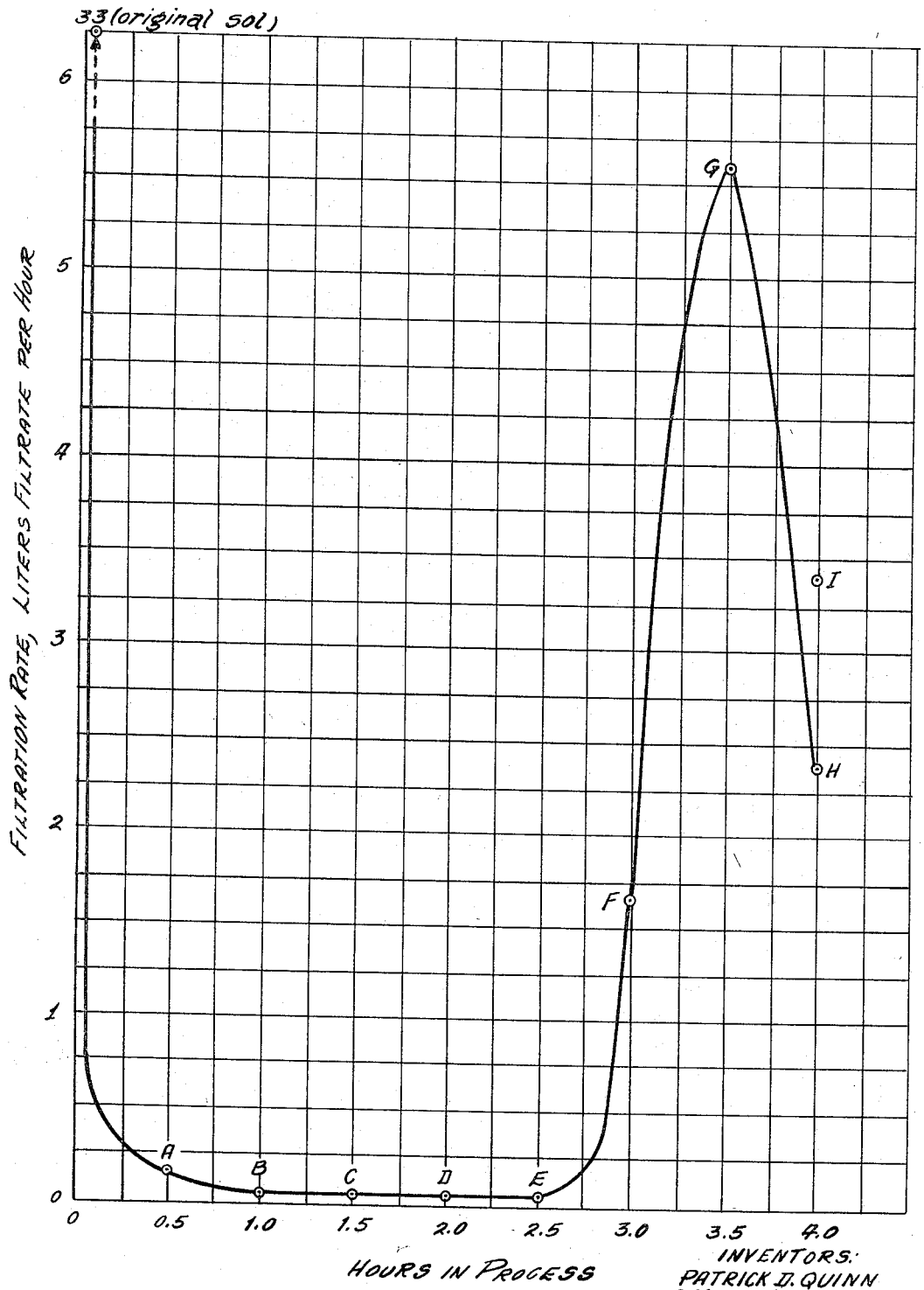

3,322,498
PRODUCTION OF SILICA LAMELLAE
Patrick D. Quinn, St. Louis, Mo., George R. Waitkins, Ossining, N.Y., and Harlan A. Depew, Glendale, Mo., assignors to American Zinc Company, St. Louis, Mo., a corporation of Maine
Filed Aug. 26, 1964, Ser. No. 392,090
6 Claims. (Cl. 23—182)

The invention relates generally to thickening agents and particularly to lamellar crystals of silica which, when incorporated in low concentration with liquids, impart remarkable stiffness thereto while quiescent, but which, while in agitation, do not render the composition immobile or unpumpable.

According to U.S. Patent No. 2,801,902, planar aggregates of silica spheroids have been formed from silica spheroids having a diameter of between 5 and 100 millimicrons by first aggregating groups of spheroids in the presence of a cationic surfactant, while maintaining the mixture at a temperature above 60° C., and then strengthening the aggregates by depositing "active" silica in the interstices between the aggregated spheroids. Study of the products resulting from the several examples described in said patent has revealed their deficiency for the thickening uses. Their thixotropic characteristics leave much to be desired. Their oil absorption rate (ASTM D281–31) is too low. Apparently much of their silica content is gel. They do not impart the requisite quiescent stiffness to liquids with which they are incorporated except where used in such proportions as to render such use unfeasible for other reasons.

It is therefore the general object of the present invention to provide silica lamellae having improved oil absorption, thixotropicity and other properties; and specifically to provide silica lamellae, and a process of making them, having: oil absorption rates of at least 4; thixotropy and viscosity characteristics such that, for example, when mixed with a solvent-refined midcontinent petroleum oil of 500 SSU at 100° F. in the proportion of 98 parts of oil to 2 parts of silica lamellae, the Brookfield viscosity is over 1000 centipoises and the "thixotropic ratio" is at least 3.0.

When an aqueous solution of sodium silicate is acidified, molecules of silica are released. They are hydrophilic. Some may dissolve in the aqueous medium while others are in Brownian movement. They exhibit little or no tendency to settle. Such an aqueous suspension of silica molecules and/or particles will hereinafter be referred to as a "silica sol."

As usually visualized, the molecular structure of a surfactant has the character of being hydrophobic at one end and hydrophilic at the other. Cationic surfactants carry a positive charge, and hence have a mutual attraction for negatively charged molecules such as silica. Consequently, when a cationic surfactant is mixed with a silica sol, the hydrophilic ends of the molecules of surfactant tend to attach themselves to silica molecules or particles, and the hydrophobic end thereof is repelled by both the silica and the aqueous medium which constitutes the continuous phase of the sol. We postulated that, if given an opportunity, the hydrophilic ends of the surfactant molecules will remove themselves from the aqueous continuous phase of the sol; and, in the act of so doing, will carry with them the silica molecules to which their hydrophilic ends are attached; with the result that the silica molecules would congregate at the interface between the aqueous continuous phase and a contingent body, such as air or gas, for which the hydrophobic end of the surfactant molecules have less repugnance. We further postulated that if and when such occurred, the molecules of silica adjacent the interface between the sol and the enveloping gas would align themselves at the interface with the silica particle immersed in the aqueous phase and with the hydrophobic end of the surfactant molecules in the gas phase; and such orientation, if maintained during precipitation of the silica, would preferentially induce the growth of silica crystals in alignment with that interface rather than normal to it.

Therefore, another object of the present invention, generally stated, is to promote the growth of silica crystals at a gas-liquid interface, and to capture the crystals in vast quantities, while restraining substantial growth in the direction normal to the interface.

We have discovered that the aforesaid objects are accomplished (and the aforesaid postulations confirmed) by converting a sodium silicate-acid-surfactant-water reaction mixture into a copious mass of foam; and maintaining it in such foamed state while the silica is precipitating and the crystals are growing in the skin of the foam bubbles. When the reaction mixture is foamed, the liquid phase of the foam constitutes the skin of the foam bubbles so that when silica precipitates from the liquid, all precipitate is arrayed in the skin of a bubble. A crystal of silica can readily grow circumferentially of a foam bubble, but its growth radially of the foam bubble beyond the thickness of the bubble skin is inhibited by the internal and external gaseous media. This tends to preserve a maximum ratio of external surface area to weight of a crystal so grown in bubble skin. Preferably, the foam is generated and maintained under conditions such that the individual bubbles in a given body thereof are about the same size, which, for best results, is below or about the dividing line between macroscopic and microscopic size.

Foaming the reaction mixture greatly increases the total area of the gas-liquid interface for a given quantity of liquid. Foaming also sub-divides the interface into a multiplicity of minute increments (gas-filled bubbles), each with inherent delineation from its neighbor. Thus, the size of a bubble inherently imposes a limit on the number of silica molecules which can be arrayed in that bubble's skin during crystallization. Obviously there is never sufficient silica in the skin of a given bubble to produce a crystal as large as the bubble itself. Since the surfactant is concentrated at the inner and outer faces of the bubble's skin (where the hydrophobic ends of the surfactant molecules are enveloped by gas), crystal growth in the radial direction is thereby limited. Consequently when the bubble is exploded after crystal growth has taken place within its skin, the resulting silica particles are lamellar crystals whose thickness is less than the bubble's skin, and whose lateral extent is but a fraction of the bubble's periphery. Hence, after the foam has been aged sufficiently to permit the silica particles (while arrayed in a bubble skin) so to crystallize, it is only a matter of convenience whether the bubbles be exploded by dehydration, by positive pressure, by negative pressure, by chemical defoaming, or by other means. In any event, when a bubble explodes, its skin is disintegrated into fragments whose dimension (normal to thickness) is many times greater than their thickness, and a fraction of the diameter of a foam bubble.

The desired foaming can be accomplished in many ways. Flowing the sol or the reactive mixture over baffles in a thin film, rotating it in a baffled drum, agitating it with a turbine impeller, or otherwise mixing it in any way that tends to introduce air or other gas into the mixture, are some of the customary ways of producing and maintaining foam which are applicable to the present invention. Such a gas may be added to the reaction mixture by means of a centrifugal pump or forced into the reaction vessel through a porous wall or conduit; or drawn into the agitated reaction mixture through a vortex or through a conduit, where the circulation generated by the agitator is such as to tend to draw the gas into the liquid. In carrying out the present invention, the foaming may increase the volume occupied by the reaction mixture as much as 1000% or as little as 30%, with good results. The amount of foam developed from a given quantity of sol depends upon the agitation, the mode of introducing the gas, the amount and character of surfactant employed, and similar factors that are obvious to those skilled in the art of producing foam. We have discovered however that (consistent with the limitation of equipment) the greater the increase in volume (by foaming) of the reaction mixture, the quicker the cure (other variables unchanged). The presence of voluminous foam also insures high quality of the resultant silica lamellae from the standpoint of their "oil absorption" rate, their thioxotropic properties, their viscosity-inducing propensity, and their external surface area per unit of weight.

The generation and maintenance of the silica sol and surfactant in a copiously foamed state also facilitates the determination of the time at which the lamellar crystals of silica have "cured," i.e., they are ready to be captured. By "cure," as used herein, is meant the aging process wherein sol-sized particles grow into larger ones which can be separated as discrete bodies from a suspending fluid. We have discovered that achievement of cure is readily and dependably signalled by a sharp increase in the filtration rate of the foam. We postulate that the increase in filtration rate is the result of converting what had previously been the gel form of silica into the crystalline form. The increase in filter rate is more or less attended (usually preceded) by clarification of the filtrate. Clarification is an indication that crystallization is taking, or has taken, place, but the sharp increase in filtration rate is a more certain indication of cure. Such a sharp increase in filtration rate is illustrated by the graph shown in the accompanying drawing. The graph portrays between points E and F the striking increase in filtration rate which occurs when the silica lamellae have cured, and the particular curve shown in the drawing is derived from the operation now to be described as Example 1.

*Example 1*

750 grams of "N" brand sodium silicate solution (sold by Philadelphia Quartz Company and reported to contain 28.7% $SiO_2$ and 8.9% $Na_2O$) was diluted to 6 liters by the addition of distilled water.

70.5 grams of sulphuric acid and 2.6 grams of Arquad 2C (75% dicoco dimethyl ammonium chloride in isopropyl alcohol, sold by Armour Chemical Company) were diluted to 6 liters by the addition of distilled water.

The respective dilute solutions were run through concentric tubes into the eye of a turbine impeller operating in a small internally baffled chamber which overflowed into a 50-liter vessel equipped for heating. Some air became entrained in the sol during the agitation in the small baffled chamber. The mixing in the small chamber is preferably completed in less than two minutes' time in order to avoid the likelihood that crystallization of silica will begin there. This operation resulted in an aerated sol whose characteristics are indicated (as "Aerated Sol") in the first line of Table I below.

In the 50-liter vessel, the aerated sol was heated while stirring violently in a manner such as to incorporate a large amount of air into the liquid and to copiously foam it.

In order to ascertain when the silica lamellae in the foam have cured, we prefer to rely upon what is hereinafter termed the "PDQ test" which consists essentially of periodically ascertaining the filtration rate of the foam until a strikingly sharp increase is noted. For example: at half-hour intervals, one kilogram samples of the foam are taken; each foam sample is filtered through two pads of 18.5 cm. Whatman #40 filter paper on a Büchner funnel at 22–25 inches vacuum; and the time required to yield measured volumes of filtrate is recorded. The results of the PDQ test in this example are stated under the heading "Filter Rate" in Table I. At the same time intervals, the temperature of the reaction mixture, its volume increase, and its pH value were ascertained and recorded as shown in the following table:

TABLE I

| Hours in Process | Perc., °C. | Volume Increase | Sample mpTenet | Filter Rate | pH Value |
|---|---|---|---|---|---|
| 0.0 | 25 | 0 |  | 32.7 | 10 |
| 0.5 | 68 | 53 | Aerated Sol | 0.19 | 10 |
| 1.0 | 97 | 128 | A | 0.05– | 10 |
| 1.5 | 93 | 73 | B | 0.05– | 10 |
| 2.0 | 91 | 95 | C | 0.05– | 10 |
| 2.5 | 100 | 277 | D | 0.07 | 10 |
| 3.0 | 95 | 20 | E | 1.66 | 10 |
| 3.5 | 91 | 25 | F | 5.6 | 1 |
|  |  |  | G |  |  |

The "filter rates" tabulated above are in terms of liters of filtrate per hour. Within the first half hour during which foam was being generated, the volume of the reaction mass had increased 53%, and its filtration rate declined to 0.19 liter of filtrate per hour. Within the second half hour, however, the volume of the reaction mass more than doubled, and its filtration rate declined to less than 0.05 liter of filtrate per hour. At succeeding half hour intervals up to 2½ hours of aging, the foam continued to filter slowly. Between 2½ and 3 hours of aging, however, the foam underwent an increase in filtration rate by almost 2400%; and during the next half hour, the filtration rate further increased by 350%.

To some extent, temperature affects the volume of the foam. Consequently, when a striking increase in the volume of foam occurs (as between A and B, as well as between D and E) which, if permitted to continue, might overflow the vessel which confines it, the temperature may be reduced to prevent loss by overflow. However, when the sharp increase in filtration rate (between E and F) is observed, input of heat may be interrupted so that thereafter the foam cools gradually.

The filtration rates of the several foam samples (above tabulated) are shown on the accompanying graph by the letters A, B, C, D, E, F, and G. The sharp break in the curve between E and F signals the achievement of the stage whereat the lamellar crystals of silica have the desirable properties herein pointed out. Thus, at any time after the break between E and F occurs, the entire batch may be filtered and the lamellae captured as the filter cake. The filter cake is then washed with water, repulped, and, if desired, adjusted to a pH of 5 with dilute sulphuric acid, then filtered, and washed again with water. The latter cake is repulped with isopropyl alcohol, filtered, and washed with isopropyl alcohol until free of water. The cake is then dehydrated by oven drying at 110° C. to give the final product.

The reduction of temperature between samples B–C and between samples E–F was deliberate, and done as a precautionary measure to prevent a sudden run-away of volume which might result in overflowing the vessel and loss of some of the batch.

To illustrate that the filtration need not take place before the bubbles of foam have exploded, the processing above described was carried on for an additional half hour (before filtering) with the following results:

Hours in process _____ 4.0
Temp. ° C. _____ 88
Percent volume increase _____ –15
Sample _____ H
Filter rate liters filt./hour _____ 2.4
pH _____ 10

Thus, between 3½ and 4 hours of process, the bubbles of foam disintegrated and the filtration rate decreased, but such did not adversely affect the desirable properties of the captured lamellae.

To illustrate the effect, on filtration rate, of pH value, a second portion (herein, and in the drawing, designated Sample I) of the defoamed reaction product (like H) at 4 hours of processing was acidified to reduce its pH from 10 to 5 by the addition of dilute sulphuric acid before filtration. This resulted in a filtration rate of 3.4 liters per hour. That filter cake was then washed with water, repulped, and filtered, and then washed with isopropyl alcohol and dried.

While, in the foregoing example, specific compositions, instrumentalities, and conditions are set forth, it is to be understood that such are only for the purpose of illustrating that the sharp break in filtration rate is a dependable indicator of cure regardless of the elapsed time involved. Parenthetically, it may be noted that the higher the temperature (short of boiling) of the processing, the quicker the cure. Similarly for a given volume increase, the greater the content of surfactant, the quicker the cure, but the poorer the quality of the resultant lamellae in the respects now to be related. The superior physical properties of the silica lamellae recovered in Samples F, G, H and I are illustrated by the following test data:

TABLE II

| Sample | Oil Absorption | Spatula Oil Yield Value | Thix Ratio | | Specific Area (m.²/gr.) (Reactivity Method) |
|---|---|---|---|---|---|
| | | | 5/50 | 10/100 | |
| F | 5.63 | 31.55 | 5.43 | 4.74 | 507 |
| G | 6.20 | 29.53 | 5.42 | 4.97 | 507 |
| H | 6.88 | 33.86 | 5.97 | 5.45 | 507 |
| I | 5.44 | 31.17 | 4.67 | 4.45 | 503 |

The "Oil Absorption" test is indicative of the amount of oil required to coat a given quantity of the silica lamellae. It is the same as the test set out at page 215 in ASTM Standards 1961 entitled "Standard Method of Test for Oil Absorption of Pigments by Spatula Rub-Out" (D281–31) except that an oil conventionally used in the compounding of lubricating grease (to wit: a solvent-refined midcontinent petroleum oil of 550 SSU at 100° F.) was used instead of linseed oil.

The "Spatula Oil Yield Value" is a procedure calculated to indicate the ratio of oil to silica lamellae which will resist gravity flow; and involves an extension of the Oil Absorption test. After the latter, more and more oil is added and spatula worked together with the silica lamellae on a glass plate; as successive measured increments of oil are spatulaed in, the glass plate is turned on edge from time to time until is it observed that the glob on the plate yields to the influence of gravity, and flows vertically downward; and the ratio of oil to silica at which such vertical flow is first observed is the Spatula Oil Yield Value expressed in terms of cubic centimeters of oil incorporated (including that of Oil Absorption test) per gram of silica lamellae.

The "Thix Ratio" is indicative of the relationship between viscosity at low degrees of agitation and viscosity at high degrees of agitation, other variables remaining constant. For example, the "Thix Ratios" in the foregoing table were obtained by uniformly incorporating the respective samples of silica lamellae in solvent-refined oil of the type aforesaid in the proportion of 2% (by weight) silica to 98% oil; and then measuring the viscosity of the composition in a Brookfield viscosimeter equipped with a No. 5 spindle operating (in successive tests on each sample) at 5, 10, 50 and 100 r.p.m. The viscosity values (in centipoises) were ascertained as follows:

TABLE III.—BROOKFIELD VISCOSITIES (CENTIPOISES)

| Sample | R.p.m. | | | |
|---|---|---|---|---|
| | 5 | 10 | 50 | 100 |
| F | 18080 | 10360 | 3328 | 2184 |
| G | 19040 | 11120 | 3520 | 2240 |
| H | 28960 | 16480 | 4840 | 3028 |
| I | 12480 | 8000 | 2672 | 1800 |
| Oil (alone) | 200 | 200 | 192 | 200 |

Thus, the "5/50" Thix Ratio for Sample F is $$\frac{18080}{3328} = 5.43$$

and the "10/100" Thix Ratio for Sample I is $$\frac{8000}{1800} = 4.45$$

The "Reactivity Method" of measuring specific area (surface area per unit of weight) of the silica lamellae is an adaptation of the calorimetric method long used for measuring specific area of zinc oxide pigments. The Reactivity Method emphasizes external area (in contrast with the so-called "B.E.T." method which includes internal area) and involves comparing (a) the heat generated within 20 seconds by reacting a given weight of the silica lamellae in a potassium flouride, hydrochloric acid system with (b) the heat generated within 20 seconds by reacting the same weight of standard silica (having known specific area) in the same system. In the present case, there was no known standard silica whose calorific reactivity equalled or exceeded that of the foam-cured lamellae of this invention—the closest standard being a silica sol known as Ludox SM having a specific area of 400 square meters per gram—so the specific area values stated in Table II above were arrived at by projecting the calorimetric values of standards having lower calorific reactivity.

The aforesaid properties of Oil Absorption rates, Spatula Oil Yield Value, Thix Ratio and Specific Area—within the ranges of magnitude shown by Table II—render the foam-cured silica lamellae highly desirable as a thickening or bodying agent for use with compositions whose physical properties must undergo change as between application and in use. For example in lay-up molding and patching work on vertical or nearly vertical surfaces, it is imperative that the plastic (such as epoxide or polyester) be highly mobile during application and equally imperative that it stay-put without slumping, sloughing, or running between the time it is emplaced and the time the plastic cures. Thix Ratios of at least 2.5 have been longed for but the foam-cured silica lamellae of this invention surpass the requirements. In the case of lubricating grease, the incorporation of 7% by weight of the foam-cured silica lamellae with the solvent-refined petroleum oil above mentioned, makes an excellent hard grease; 5–6% of the foam-cured lamellae, a cup grease (No. 2 Grease) having a cone penetration (ASTM D217–60T) of between 265 and 295 tenths of a millimeter or a "micro penetration" (ASTM D1403–56T) of 1017–1130; and 1–1.5% of the foam-cured lamellae, a semi-fluid grease of the kind employed in automotive differential gears. Other uses of the foam-cured lamellar crystals of silica are in paint, plaster, caulking and sealing components.

*Example 2*

996 grams of sodium silicate (28.7% $SiO_2$ and 8.9% $Na_2O$) was stirred into distilled water to a volume of 8 liters, and 438 cc. 4.92 N $H_2SO_4$ plus 43.0 grams Arquad 2C were similarly made up to 8 liters. These two solutions were reacted through a turbomixer to give a foamy slurry of pH 9.8 and a $SiO_2$ concentration of 1.8%. The increase in volume due to the presence of the foam was about 165% of the original volume.

The slurry was stirred and heated to 80° C. in 33 minutes and the temperature was maintained above 80° C. for 4 hours and 20 minutes. At this time, two buckets of this foamy slurry were removed (about 21 lbs.) and placed in an electric oven at 80° C. where they were kept at this temperature for 18½ hours. The samples were then combined in a large crock, and stirred. The pH was 10.5. A small test sample filtered fast and clear, indicating that the aging was complete to form a pigment containing 90 parts of $SiO_2$ to 10 parts of quaternary. The slurry was reduced in pH to 5–5.5 with 100 cc. of 5N $H_2SO_4$. It was then filtered by suction, washed 7 times with 2 liters of distilled water and dried at 110° C.

The spatula oil yield value was 26.5 cc./g.

Example 3

249 grams sodium silicate with sufficient ion exchange treated water to make 2 liters was reacted with 29.4 grams 66° Baumé $H_2SO_4$ (93.19%) and 3.0 grams Arquad 2C plus treated water to make 2 liters, in the turbomixer to a quite foamy solution (a volume increase of about 130%). After approximately 2 hours heating time with the temperature rising to 95°, and the pH at 10.5, the heat was turned off, and a 500 cc. portion removed and titrated with Arquad 2C (2% solution) until a settled sample separated cleanly into a clear bottom layer and white opaque foam layer. Calculations showed 95% $SiO_2$, 5% quaternary on the titrated sample. To the remaining 3.5 liters was added 100 cc. of two-percent water solution of Arquad 2HT (75% dimethyl dihydrogenated tallow ammonium chloride, 25% isopropyl alcohol) to make a total of 5% quaternary on the pigment, and 1 liter was removed as Sample B. The remaining 2.5 liters, Sample A, was stirred while adding 20 cc. 5 N $H_2SO_4$ to reduce pH to 5.3, and then filtered on a large table-top Buchner and washed nearly sulfate free with 10 times 250 cc. treated water. To Sample B was added 21.5 cc. of 2% Arquad 2HT while stirring to bring the percentage of silica to 93.3%, and 6.7% total quaternary. 7 cc. 5 N $H_2SO_4$ was added, reducing pH to 5, and the resulting solution was filtered (slightly more foamy than sample A). The filtered material was washed nearly sulfate free with 10 times 100 cc. of treated water. 50 grams of each Sample A and Sample B were dried at 110° C. and spatula oil yield tested with the result that A was 16.5, B 16.0.

Example 4

750 g. of Du Pont's colloidal silica, Ludox SM (15% concentration with a particle size of 7 millimicrons) was added to 5450 cc. of water in a 12 qt. enamel bucket, making 1.8% $SiO_2$ concentration, and this solution was stirred with the "Lightin'" mixer using a turbine propeller increasing the volume by about 70%. The pH was adjusted to 9 by adding 3.5 cc. of 5 N NaOH, and then 75.3 cc. of 2% Arquad 2C was added to make 1% quaternary on the $SiO_2$. Heat was applied, to temperature 90° and, the pH having dropped to 8, 15 cc. of 5 N NaOH was added to bring the pH to 10±. The temperature was maintained at 92° during the next hour (total heating time to this point—2½ hours), at which time heat was removed, and the solution was permitted to stand over the week-end. Upon resuming the process, the pH was again adjusted to 9.5–10 by adding 5 cc. of NaOH, and the stirring and heating was continued for the next four hours. At this time 32 cc. of 5 N $H_2SO_4$ brought the pH down to 5.5–6.0, and the product was filtered on a 25 cm. filter, and washed sulfate free with 4 to 6 half-liter portions of treated water. A 100 g. sample was extracted with isopropyl alcohol until the filtrate had a specific gravity of 0.78–0.79, and the cake was then dried in the oven at 110°. This sample gave a spatula oil yield of 31.

Example 5

373.5 g. of "N" Brand sodium silicate solution was diluted to 3 liters by the addition of distilled water.

5.7 g. (equivalent to 5% on the silica) of dimethyl coco amine and 173 cc. of 5 N $H_2SO_4$ were diluted to 3 liters by the addition of distilled water.

The respective dilute solutions were run through concentric tubes into the eye of a turbine impeller operating in a small internally baffled chamber which overflowed into a 10 qt. granite pail. A foamy slurry was formed with a pH of about 9.0.

4 liters of this slurry was kept in the pail which was equipped with a laboratory Lightnin' stirrer, a thermometer, and a 1¼" baffle. The pail was placed on a tripod over two laboratory burners and heating and stirring was commenced.

After 17 minutes heating and stirring, the temperature was 87° C. The volume was about the same as the starting volume (4 liters) and there was no foam present. At this point, over a period of the next 29 minutes, 18 cc. of 5 N $H_2SO_4$ was added in 2 cc. increments, while stirring and maintaining the temperature at 87 to 96° C. Foam began to form until there was a 40% increase in volume. The pH of the slurry was 8–8.5. After an additional 8 minutes of heating and stirring, the foam had increased to 150% of the original volume and the temperature was 98–100° C. At this point, a small sample was removed, which filtered rather slowly, indicating that the cure was still incomplete. 2 cc. more of 5 N $H_2SO_4$ was added, and heating and stirring continued an additional 30 minutes. At the end of this time, the slurry started to de-air.

A small sample now filtered fast with clear filtrate.

The pH was reduced to 5.5 with 8 cc. of 5 N $H_2SO_4$ and the slurry was filtered on three 18.5 cm. Buchners. The wet press cake was washed with distilled water until the wash water was free of $SO_4^{--}$ when tested with $BaCl_2$ solution.

Approximately ⅓ of the washed press cake was slurried in isopropyl alcohol in a Waring Blendor and filtered. Washing was continued with fresh isopropyl alcohol until the wash alcohol was free of water as determined by specific gravity readings.

The alcohol wet cake was dried at 110° C. to yield 20 gms. of soft product.

The oil absorption rate was: 4.0 gm./gm.
The spatula oil yield value was: 22.43 cc./gm.

While in the foregoing examples, certain specific surfactants were employed, it is not to be misunderstood that the invention is limited to those particular surfactants. While in our experience, Arquad 2C is best, and hence is preferred, other cationic surfactants have been used with success. The cationic surfactants which we have found satisfactory have the general character of quaternary ammonium salts having at least one long carbon chain (for example, as dilauryldimethyl ammonium chloride) but are not confined to quaternary amines. Numerous other compounds (e.g., phosphonium, sulphonium and arsonium) and organic nitrogen bases other than the quaternaries, such, for example, as amine oxides and other long chain tertiary amines, are quite satisfactory. Other examples of suitable cationic surface active agents are 1-(2-hydroxyethyl)-2-heptadecenyl and heptadecadienyl-1 (or 3)-(4 chlorobutyl)-2 imidazolinium chloride (Nalquat G–9–12); dodecyl trimethyl ammonium bromide; cetyl trimethyl ammonium chloride; lauryl pyridinium chloride; dodecyl trimethyl ammonium bromide; octyl trimethyl ammonium chloride; decyl trimethyl ammonium chloride; octadececyl trimethyl ammonium chloride; dodecyl trimethyl ammonium chloride (Arquad 12); Hexadecyl trimethyl ammonium chloride (Arquad 16); Octadecyl trimethyl ammonium chloride (Arquad 18);

benzyl trimethyl ammonium chloride; coco ($C_{8-14}$)-trimethyl ammonium chloride (Arquad C); disoya ($C_{16}$–$C_{18}$) dimethyl ammonium chloride (Arquad 2S); dihydrogenated tallow ($C_{16}$–$C_{18}$) dimethyl ammonium chloride (Arquad 2HT); 1,1,3,3-tetramethyl butyl phenoxy ethoxy ethyl dimethyl benzyl ammonium chloride (Hyamine 1622); di-dodecenyl dimethyl ammonium chloride; octyl dimethyl sulfonium iodide; dodecyl dimethyl sulfonium iodide; cetyl dimethyl sulfonium iodide, octyl triethyl phosphonium iodide; dodecyl triethyl phosphonium iodide; cetyl triethyl phosphonium iodide; benzyldimethyl octyl phosphonium chloride; benzyl dimethyl dodecyl phosphonium chloride; benzyl dimethyl cetyl phosphonium chloride; octyl triethyl arsonium iodide; dodecyl triethyl arsonium iodide; cetyl triethyl arsonium iodide; benzyl dimethyl octyl arsonium chloride; benzyl dimethyl dodecyl arsonium chloride; benzyl dimethyl cetyl arsonium chloride; octyl trimethyl arsonium iodide; dodecyl trimethyl arsonium iodide; cetyl trimethyl arsonium iodide; gelatin; casein and related animal and plant proteins; primary, secondary and tertiary long chain amines in organic solvents or as their acid reaction products, and dimethyl cetyl ($C_{10}$–$C_{18}$) ammonium oxide.

The foam-cured silica lamellae produced according to this invention have an external surface area in excess of 350 square meters per gram on the average throughout a production batch and, on the same average, are more than 50 times as great in lateral dimension as in thickness. They are composed of at least about 93% silica, and may contain up to about 3% of chemically bound water and, unless it has been removed, will retain a residual coat or part-coat of cationic surfactant, the amount of which will depend upon the amount employed in the process of their manufacture and the washing techniques employed. Where the foam-cured silica lamellae are to be used under circumstances where the presence of residual surfactant is undesirable (for instance, in silicone rubber and other situations where the curing or utilization temperature is high enough to char the surfactant, and when such charring would be objectionable) the silica lamellae may be denuded of surfactant by ignition at a temperature below that which would sinter them together. In the absence of a completely enveloping hydrophobic coating, the silica lamellae will adsorb water in an amount such as to maintain them in balance with ambient atmosphere, and in making the tests which yielded the above-stated data (concerning the physical properties of the lamellae), no effort was made to prevent such adsorption of atmospheric moisture.

As hereinbefore related, the foam-cured silica lamellae are highly desirable thickening and bodying agents, especially where substantial thixotropicity is required to be developed by relatively small proportions of chemically inert solid in relatively large proportions of liquid.

From the foregoing description, it should be apparent that the invention accomplishes its objects, and provides not only a new and useful product, but also a readily controllable process of making it. While the invention has been disclosed in detail, such is not to be construed as limiting the invention to the details of the disclosure. On the contrary, those skilled in the art will readily perceive modifications and variations of the invention which, while not herein disclosed, do not differ in principle from it, and therefore are contemplated by and within the spirit and scope of this invention.

Having thus described the invention, what is claimed and desired to be secured by Letters Patent is:

1. In the art of making silica lamellae, the process comprising, providing a silica sol containing a cationic surfactant, foaming the sol to increase its volume by at least 30%, and maintaining the foam until silica has crystallized.

2. In the art of making silica lamellae, the process comprising, providing a silica sol containing a cationic surfactant, foaming the sol to increase its volume by at least 30%, maintaining the foam until its filtration rate undergoes a sharp increase, and then recovering crystallized silica.

3. In the art of making silica lamellae, the process comprising, providing a silica sol containing a cationic surfactant, foaming the sol to increase its volume by at least 30%, maintaining the foam while periodically determining its filtration rate, and then, when the filtration rate undergoes a sharp increase, recovering crystallized silica.

4. In the art of making silica lamellae, the process comprising, providing a reactive mixture of sodium silicate, water, acid, and a cationic surfactant, incorporating gas into the mixture, agitating the mixture at temperatures on the order of 60–100° C. with concurrent generation of foam until substantially all increments of the mixture have been converted to foam, and thereafter dewatering said mixture whereby to recover silica lamellae.

5. The process of claim 4 wherein the time of dewatering is determined by the PDQ test.

6. In the art of preparing thin silica lamellae having a large active surface area from an aging silica sol, the method comprising adding to the aging sol an amount of cationic surface active material sufficient to create a foam upon being agitated, but insufficient to precipitate the sol particles, agitating the sol with concurrent incorporation of gas until an amount of foam sufficient to increase the volume of the sol by at least 30% is present, and maintaining agitation until foam subsides and separating silica lamellae from the fluids.

References Cited

UNITED STATES PATENTS 2,801,902   8/1957   Alexander et al. _____ 23—182

OSCAR R. VERTIZ, *Primary Examiner.*

A. GREIF, *Assistant Examiner.*